March 26, 1968     A. E. COLATO     3,374,936
DISPOSABLE FOOD STORAGE AND SERVING DEVICE
Filed Aug. 18, 1965
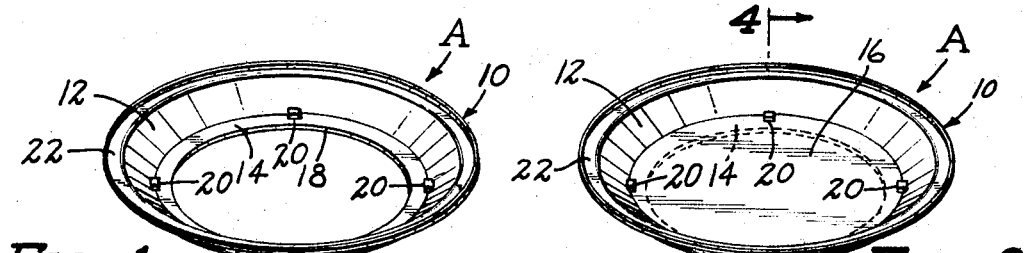
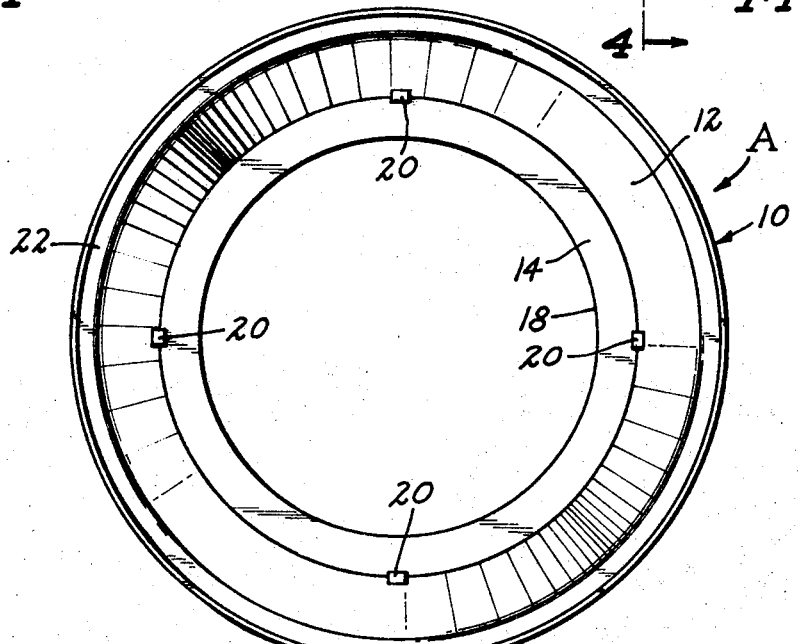
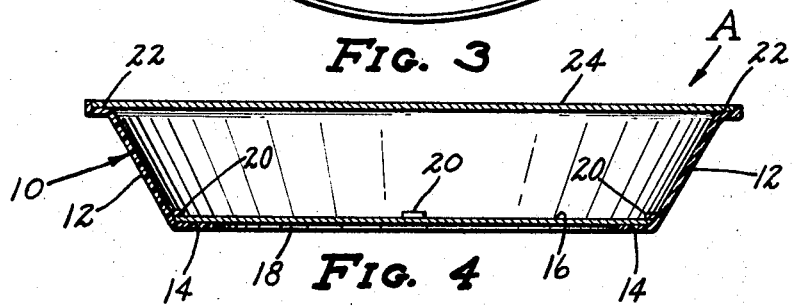
INVENTOR.
ALBERT E. COLATO
BY
*Caswell, Legaard & Wickes*
ATTORNEYS 3,374,936
DISPOSABLE FOOD STORAGE AND SERVING DEVICE
Albert E. Colato, Tujunga, Calif., assignor to Plastics, Inc., St. Paul, Minn.
Filed Aug. 18, 1965, Ser. No. 480,701
1 Claim. (Cl. 229—2.5)

The invention relates generally to containers for food and more particularly to a container which can be used for both the storing of food and the serving of food therefrom.

Present day cardboard plates for serving food commonly referred to as "picnic" plates are quite inadequate for supporting food thereon particularly when held by one hand of the user. To simply duplicate the "picnic" plate in a rigid plastic does not solve the problem, for the cost alone for material would prohibit disposability. Also a relatively large press would be required to mold the entire plate thereby further increasing cost and further prohibiting disposability together with the fact that mold-cycling time would be undesirable which adds further to the cost.

It is an object of the invention to provide a food storage and food serving device which may be held in one hand of the user with food thereon and which is constructed in such a manner that the cost thereof warrants the same as a disposable item.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a perspective view of the support portion of the device with the bottom portion thereof removed.

FIGURE 2 is a perspective view of the complete device with the cover removed.

FIGURE 3 is a top plan view of the support portion with the bottom portion and the cover removed.

FIGURE 4 is a sectional view on the line 4—4 of FIGURE 2 with the cover shown.

Referring to the drawings in detail, the disposable food storage and food serving device A includes the dish-like portion 10 having the annular upwardly flaring support wall structure 12. Extending radially inwardly from the periphery of the lower edge of the wall 12 is the annular relatively narrow flange 14, which acts as a support for the bottom member 16. The annular flange 14 results in the circular void 18 concentric with the annular wall 12.

The bottom member 16 is rectilinear and is formed from a piece of flat treated cardboard which is circular in formation, the diameter of the bottom member being substantially that of the diameter of the lower edge of the wall 12 where it joins with the annular flange 14. The bottom member 16 is placed upon the support flange 14 and secured thereto by means of an adhesive or by forcing the edge of the bottom under the small spaced lugs 20 formed on and extending inwardly from the wall 12. The upper peripheral edge of the wall 12 is formed with a recess 22 in which the circular cover 24 is inserted thereby providing a cover for the contents of the device A.

The dish-like portion 10 is formed of a substantially rigid plastic having a rigidity whereby the device does not require external support to prevent collapse as it is held extended with the fingers of one hand of the user.

With the cardboard bottom wall 14 the cost of the entire unit is reduced. Also, with the circular void 18 the projected area of plastic of the device is reduced thereby allowing the use of a smaller press which allows a faster cycle of molding. The reduction in cost of producing device A, as a result of the construction set forth, is to a point where the device may be disposed of after a single use. The plastic annular wall 12 together with the annular support wall 14 provides sufficient rigidity to allow the device A to be held by and extended from one hand of the user. The dish-like portion 10 may be formed of clear plastic whereby the contents of the device may be easily identified. In addition the bottom member 16 may be printed upon before securing the same to the support portion 12. As a result of the separate pieces 12 and 16 the same may be made of different color materials.

The invention is not to be understood as restricted to the details set forth since these may be modified within the scope of the appended claim without departing from the spirit and scope of the invention.

Having thus described the invention what is claimed as new and desired to be secured by letters Patent is:

1. A disposable food storage and serving device comprising:
   (a) a dish-like body portion having an annular outwardly flaring wall structure,
   (b) said annular wall structure having an annular flange extending radially and directly inwardly from the inner periphery thereof to form a bottom support and a void concentrically of the wall structure,
   (c) a flat circular bottom portion resting on the flange, the diameter of said bottom portion being no greater than the outer diameter of said arcuate flange means where it extends from said annular flaring wall,
   (d) lug means extending radially inwardly from said wall structure and spaced from said annular flange and under which said bottom portion is secured in pressing engagement with said flange,
   (e) said wall structure molded of a plastic material whereby the device with material therein has sufficient rigidity to be held by the fingers of one hand in an extended position without external support.

References Cited

UNITED STATES PATENTS

| | | |
|---|---|---|
| 1,020,187 | 3/1912 | Claussen. |
| 1,164,962 | 12/1915 | Sayford. |
| 2,231,223 | 2/1941 | Page |
| 2,315,591 | 4/1943 | Carew. |
| 2,746,669 | 5/1956 | Moore _____ 229—43 |
| 3,104,045 | 9/1963 | Bruschini et al. _____ 229—1.5 X |
| 3,154,215 | 10/1964 | Vesconte _____ 220—97 |
| 3,155,303 | 11/1964 | Fenkel _____ 229—2.5 |

WILLIAM T. DIXSON, Jr., *Primary Examiner.*

GEORGE O. RALSTON, JOSEPH R. LECLAIR,
*Examiners.*